United States Patent  [10] Patent No.: US 8,264,759 B2
Moiseev et al.  [45] Date of Patent: Sep. 11, 2012

(54) FAST ALL-OPTICAL SWITCH

(75) Inventors: Sergey Moiseev, Calgary (CA); Ali Kamli, Jazan (SA); Barry Sanders, Calgary (CA)

(73) Assignee: UTI Limited Partnership, Calgary, Alberta (CA)

( * ) Notice: Subject to any disclaimer, the term of this patent is extended or adjusted under 35 U.S.C. 154(b) by 151 days.

(21) Appl. No.: 12/800,308

(22) Filed: May 12, 2010

(65) Prior Publication Data

US 2011/0075239 A1    Mar. 31, 2011

Related U.S. Application Data

(60) Provisional application No. 61/177,414, filed on May 12, 2009.

(51) Int. Cl.
  *G02F 1/01* (2006.01)
(52) U.S. Cl. ...................................... 359/241
(58) Field of Classification Search .......... 359/241–248; 977/933; 398/12, 13, 19, 45, 92, 200
  See application file for complete search history.

(56) References Cited

U.S. PATENT DOCUMENTS 7,277,636 B1 * 10/2007 Gazdzinski ............. 398/53
2009/0073450 A1 * 3/2009 Boyd et al. ............. 356/454

OTHER PUBLICATIONS

Akimov et al., "Generation of single optical plasmons in metallic nanowires coupled to quantum dots," *Nature*, 450: 402-405, 2007.
Andre et al., "Nonlinear optics with stationary pulses of light," *Phys. Rev. Lett.*, 94: 063902, 2005.
Bajcsy et al., "Stationary pulses of light in an atomic medium," *Nature*, 426: 638-641, 2003.
Barnes et al., "Surface Plasmon subwavelength optics," *Nature*, 424: 824-830, 2003.
Beil et al., "Electromagnetically induced transparency and retrieval of light pulses in a Lambda-type and a V-type level scheme in Pr:YSiO," *J. Phys. B: At. Mol. Opt. Phys.*, 41: 074001, 2008.
Bermel et al., "Single-photon all-optical switching using waveguide-cavity quantum electrodynamics," *Phys. Rev. A*, 74:043818-1-043818-5, 2006.
Bigelow et al., "Superluminal and Slow Light Propagation in a Room-Temperature Solid," *Science*, 301: 200-202, 2003.
Bigelow et al., "Observation of Ultraslow Light Propagation in a Ruby Crystal at Room Temperature," *Phys. Rev. Lett.*, 90(11): 113903-1-113903-4, 2003.
Boller et al., "Observation of electromagnetically induced transparency," *Phys. Rev. Lett.*, 66(20):2593-2596, 1991.
Boyd, *Nonlinear Optics*, Academic Press: San Diego, 2003.
Chang et al., A single-photon transistor using nanoscale surface plasmons, *Nature Physics*, 3: 807-812, 2007.
Chang et al., "Quantum Optics with Surface Plasmons," *Phys. Rev. Lett.*, 97: 053002, 2006.

(Continued)

*Primary Examiner* — David N Spector
*Assistant Examiner* — Tuyen Tra
(74) *Attorney, Agent, or Firm* — Fulbright & Jaworski L.L.P.

(57) ABSTRACT

An apparatus, system, and method for fast all-optical switching is presented. In one embodiment, the apparatus includes a first light transmitting medium. The apparatus may also include a second light transmitting medium coupled to the first light transmitting medium and disposed to form an interface region between the first light transmitting medium and the second light transmitting medium. Additionally, the apparatus may include a plurality of Lambda atoms disposed in the interface region, the Lambda atoms adapted to cause Electromagnetically-Induced Transparency (EIT) in the interface region in response to an incident photon.

12 Claims, 8 Drawing Sheets

OTHER PUBLICATIONS

Chang et al., "Strong coupling of single emitters to surface plasmons," *Phys. Rev. B*, 76: 035420, 2007.

Chen et al., "Low light-level cross-phase-modulation based on stored light pulses," *Phys. Rev. Lett.*, 96(4): 043603, 2006.

Chettiar et al., "Dual-band negative index metamaterial: double negative at 813 nm and single negative at 772 nm," *Opt. Lett.*, 32:1671-1673, 2007.

Dragoman and Dragoman, "Plasmonics: Applications to nanoscale terahertz and optical devices," *Progress in Quantum Electronics*, 32(1): 1-41, 2008.

Engheta and Ziolkowski, *Metamaterials: Physics and Engineering Explorations*, Wiley: New Jersey, 414 pages, 2006.

Field et al., "Observation of electromagnetically induced transparency in collisionally broadened lead vapor," *Phys. Rev. Lett.*, 67(22): 3062-3065, 1991.

Fischer et al., "Enhanced nonlinear optical response of composite materials," *Phys. Rev. Lett.*, 74(10):1871-1874, 1995.

Fleischhauer et al., "Electromagnetically induced transparency: Optics in coherent media," *Rev. Mod. Phys.*, 77:633-673, 2005.

Govyadinov and Podolskiy, "Gain assisted slow to superluminal group velocity manipulation in nanowaveguides," *Phys Rev Lett.*, 99(22):1-4, 2006.

Harris and Hau, "Nonlinear optics at low light levels," *Phys. Rev. Lett.*, 82(23): 4611-4614, 1999.

Harris and Yamamoto, "Photon switching by quantum interference," *Phys. Rev. Lett.*, 81(17):3611-3614, 1998.

Hau and Harris, "Light speed reduction to 17 meters per second in an ultracold atomic gas," *Nature*, 397: 594-598, 1999.

Holliday et al., "Spectral hole burning and holography in an Y2SiO5:Pr3+ crystal," *Phys. Rev. B*, 47(22): 14741-14752, 1993.

Kamli and Babiker, "Dielectric cavity QED between photonic crystals: An effective uniaxial medium approach," *Phys. Rev. A*, 62:043804, 2000.

Kamli et al., "Coherent control low loss surface polaritons," *Phys. Rev. Lett.*, 101: 263601-263604, 2008.

Kastel et al., "Tunable negative refraction without absorption via electromagnetically induced chirality," *Phys. Rev. Lett.*, 99: 073602, 2007.

Kok et al., "Linear optical quantum computing with phonic qubits," *Rev. Mod. Phys.*, 79: 135-174, 2007.

Landau et al., *Electrodynamics of Continuous Media*, 2nd Ed., Elsevier: Oxford, 1984.

Liu et al., "Observation of coherent optical information storage in an atomic medium using halted light pulses," *Nature*, 409: 490-493, 2001.

Longdell et al., "Stopped light with storage times greater than one second using electromagnetically induced transparency in a solid," *Phys. Rev. Lett.*, 95: 063601, 2005.

Lukin and Imamogdlu, "Controlling photons using electromagnetically induced transparency," *Nature*, 413: 273-276, 2001.

Lukin and Imamogdlu, "Nonlinear optics and quantum entanglement of ultraslow single photons," *Phys. Rev. Lett.*, 84: 1419, 2000.

Maier et al., "Local detection of electromagnetic energy transport below the diffraction limit in metal nanoparticles Plasmon waveguides," *Nature Materials*, 2:229-232, 2003.

Maier, "Gain assisted propagation of electromagnetic energy in subwavelength surface Plasmon polaritons gap waveguides," *Opt. Commun.*, 258: 295, 2006.

Maier, *Plasmonics: Fundamentals and Applications*, Springer: New York: 2007.

Masalas and Fleischhauer, "Scattering of dark-state polaritons in optical lattices and quantum phase gate for photons," *Phys. Rev. A*, 69: 061801-1-061801-4, 2004.

Mena et al., "Heavy carriers and non-Drude optical conductivity in MnSi," *Phys. Rev. B*, 67: 241101R-1-241101R-4, 2003.

Milonni, *Fast Light, Slow Light and Left-Handed Light*, IOP: London, 2005.

Nezhad et al., "Gain assisted propagation of surface Plasmon polaritons on planar metallic waveguides," *Opt. Exp.*, 12: 4072, 2004.

Noginov et al., "Compensation of loss in propagating surface Plasmon polaritons by gain in adjacent dielectric medium," *Opt. Exp.*, 16:1385, 2008.

Ottaviani et al., "Polarization qubit phase gate in driven atomic media," *Phys. Rev. Lett.*, 90: 197902-1-197902-4, 2003.

Papasimakis et al., "Metamaterial analog of electromagnetically induced transparency," *Phys. Rev. Lett.*, 101: 253903-1-253901-4, 2008.

Petrosyan and Fleischhauer, "Quantum information processing with single photons and atomic ensembles in microwave coplanar waveguide resonators," *Phys. Rev. Lett.*, 100: 170501-1-170501-4, 2008.

Petrosyan and Kurizki, "Symmetric photon-photon coupling by atoms with Zeeman-split sublevels," *Phys. Rev. A*, 65: 033833-1-033833-4, 2002.

Raimond et al., "Manipulating quantum entanglement with atoms and photons in a cavity," *Rev. Mod. Phys.*, 73: 565-582, 2001.

Schmidt and Imamogdlu, "Giant Kerr nonlinearities obtained by electromagnetically induced transparency," *Opt. Lett*, 21:1936-1938, 1996.

Scully and Zubairy, *Quantum Optics*, Cambridge University Press: Cambridge, 1997.

Seidel et al., "Stimulated emission of surface plasmons at the interface between a silver film and an optically pumped dye solution," *Phys. Rev. Lett.*, 94(17):177401-1-177401-4, 2005.

Tame et al., "Single-photon excitation of surface plasmon polaritons," *Phys. Rev. Lett.*, 101(19):190504-1-190504-4, 2008.

Tsakmakids et al., "'Trapped rainbow' storage of light in metamaterials," *Nature*, 450: 397-401, 2007.

Turukhin et al., "Observation of ultraslow and stored light pulses in a solid," *Phys. Rev. Lett.*, 88: 023602, 2002.

Vlasov et al., "High-throughput silicon nanophotonic wavelength-insensitive switch for on-chip optical networks," *Nature Photonics*, 2: 242-246, 2008.

Marzlin et al., "Uniform cross-phase modulation for nonclassical radiation pulses," *Journal of the Optical Society of America B*, 27:A36-A45, 2010.

Wang et al., "Large cross-phase modulation between slow co-propagating weak pulses in Rb," *Phys. Rev. Lett.*, 97:063901, 2006.

\* cited by examiner

FAST ALL-OPTICAL SWITCH

CROSS-REFERENCE(S) TO RELATED APPLICATION(S)

This application claims priority to U.S. Provisional Patent Application Ser. No. 61/177,414 filed May 12, 2009. This provisional application is expressly incorporated by reference.

BACKGROUND OF THE INVENTION

1. Field of the Invention

The present invention relates generally to the fields of optical communications and photonics. More particularly, it relates to fast all-optical switching devices.

2. Description of Related Art

A low-loss nanoscale all-optical switch could revolutionize photonics through its compatibility with proposed nanophotonic structures, speed, and efficacy at low light levels. Although such a device is needed, its creation has previously been prevented by the poor trade-off between confinement of light, losses, and the incompatibility of low light levels with strong Kerr nonlinearity. Some of these challenges may be ameliorated by ongoing research; giant cross-phase modulation (XPM) could be enabled by double electromagnetically induced transparency and surface plasmons could allow sub-wavelength optics, albeit with large losses that may be lessened by clever strategies.

The referenced shortcomings are not intended to be exhaustive, but rather are among many that tend to impair the effectiveness of previously known techniques in photonics; however, those mentioned here are sufficient to demonstrate that the methodologies appearing in the art have not been satisfactory and that a significant need exists for the techniques described and claimed in this disclosure.

SUMMARY OF THE INVENTION

An apparatus for fast all-optical switching is presented. In one embodiment, the apparatus includes a first light transmitting medium. The apparatus may also include a second light transmitting medium coupled to the first light transmitting medium and disposed to form an interface region between the first light transmitting medium and the second light transmitting medium. Additionally, the apparatus may include a plurality of Lambda atoms disposed in the interface region, the Lambda atoms adapted to cause Electromagnetically-Induced Transparency (EIT) in the interface region in response to an incident photon.

In a further embodiment, the apparatus may include a first optical conductor coupled to at least one of the first light transmitting medium and the second light transmitting medium, the first optical conductor configured to direct a photon to the interface region. The apparatus may also include a second optical conductor coupled to at least one of the first light transmitting medium and the second light transmitting medium, the second optical conductor configured to receive the photon from the interface region.

In still another embodiment, the first optical conductor is configured to direct a plurality of laser beams to the interface region to create two surface polaritons in the interface region. The apparatus may be further adapted to perform quantum cryptography on the photon. In a further embodiment, at least one of the first light transmitting medium and the second light transmitting medium comprises negative index meta-material.

A system is also presented for fast all-optical switching. In one embodiment, the system includes a first laser source configured to transmit a signal laser beam. The system may additionally include a second laser source configured to transmit an escort laser beam. In a further embodiment, the system may include a photon modulator coupled to the first laser source and the second laser source. The photon modulator may be adapted to modulate the signal laser beam. The photon modulator may include a first light transmitting medium, a second light transmitting medium coupled to the first light transmitting medium and disposed to form an interface region between the first light transmitting medium and the second light transmitting medium, and a plurality of Lambda atoms disposed in the interface region, the Lambda atoms adapted to cause Electromagnetically-Induced Transparency (EIT) in the interface region in response to an incident photon. In still a further embodiment, the system may include one or more photon directors configured to direct a path of the signal laser beam responsive to the modulation of the signal laser beam.

A method is also presented for fast all-optical switching. In one embodiment, the method includes providing a structure comprising a first light transmitting medium, a second light transmitting medium coupled to the first light transmitting medium and disposed to form an interface region between the first light transmitting medium and the second light transmitting medium, and a plurality of Lambda atoms disposed in the interface region, the Lambda atoms adapted to cause Electromagnetically-Induced Transparency (EIT) in the interface region in response to an incident photon. The method may also include directing a photon to the interface region to induce formation a first surface polariton and a second polariton that propagate through the interface region. In a further embodiment, the method includes modulating a phase of the photon according to a propagation speed of the first surface polariton with reference to the propagation speed of the second surface polariton.

In one embodiment, the method may also include receiving the photon from a first optical conductor coupled to at least one of the first light transmitting medium and the second light transmitting medium, the first optical conductor configured to direct a photon to the interface region. Likewise, the method may further include transmitting the photon to a second optical conductor coupled to at least one of the first light transmitting medium and the second light transmitting medium, the second optical conductor configured to receive the photon from the interface region. In a further embodiment, the method may include receiving a plurality of laser beams from the first optical conductor, wherein the first optical conductor is further configured to direct the plurality of laser beams to the interface region to create the first surface polariton and the second polariton in the interface region.

In still another embodiment, the method may include encrypting the photon according to a quantum cryptography scheme. In a further embodiment, at least one of the first light transmitting medium and the second light transmitting medium comprises negative index meta-material.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

By coupling two surface polaritons (SPs) in a double electromagnetically-induced transparent (DEIT) medium situated at an interface between a negative-index metamaterial (NIMM) with suitable parameters and a dielectric medium, giant cross-phase modulation between the two SPs may be achieved in a low-loss, sub-wavelength confinement regime. In fact, a mutual phase of $\pi$ may be attainable at the single photon level, which enables deterministic single-photon quantum logic gates for nanooptical quantum computing.

The SP is a bound charge excitation at the interface of a dielectric with another medium, and this excitation may propagate along the surface. Using strong confinement the SP may be adapted for nanophotonic applications but unfortunately with strong losses. The reason for the trade-off between confinement and losses for dielectric-metal interfaces is that strengthening confinement of the polariton on the dielectric side may increase the fraction of electromagnetic energy on the metal side of the interface. Energy transport at optical frequencies on the metal side may involve migration of free electrons hence large losses. Strategies to overcome these losses, based on gain media or confinement, have had limited success. The present embodiments, however, are provided to achieve both low loss and high non-linearity, which overcome many of the shortcomings of the prior art.

System Architecture

Figure 1:
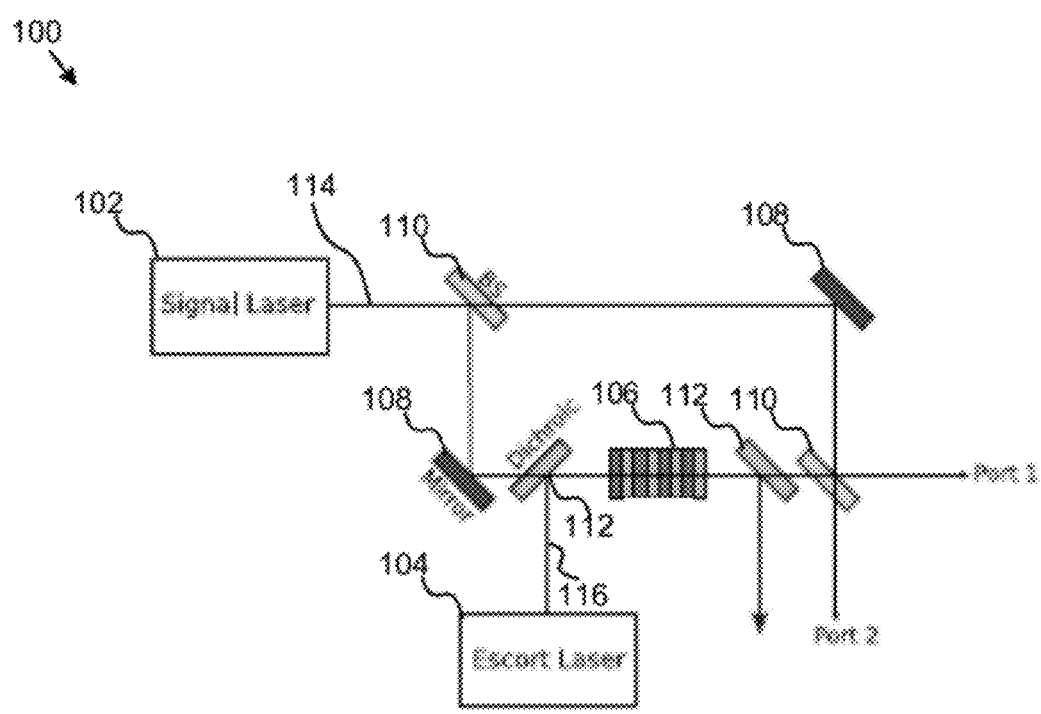
FIG. 1 is a schematic block diagram illustrating one embodiment of a system 100 for fast all-optical switching.

FIG. 1 illustrates one embodiment of a system 100 for fast all-optical switching. In the depicted embodiment, the system 100 includes a first laser source 102 configured to transmit a signal laser beam 114. The system 100 may additionally include a second laser source 104 configured to transmit an escort laser beam 116.

In a further embodiment, the system 100 may include a photon modulator 106 coupled to the first laser source and the second laser source. The photon modulator 106 may be configured to modulate the signal laser beam 114. Alternatively, the photon modulator 106 may be configured to modulate the escort laser beam 116 or both beams 114, 116. The photon modulator 106 may include structural components that are described in further detail below with relation to FIG. 2.

In still a further embodiment, the system 100 may include one or more photon directors 108-112 configured to direct a path of the signal laser beam 114 responsive to the modulation of the signal laser beam. For example, the system 100 may include one or more of a mirror 108, a beam splitter 110, and/or a dichroic device 112. A dichroic device 112 may include a lens, a filter, and/or a reflector.

All-Optical Switch Structure

Figure 2:
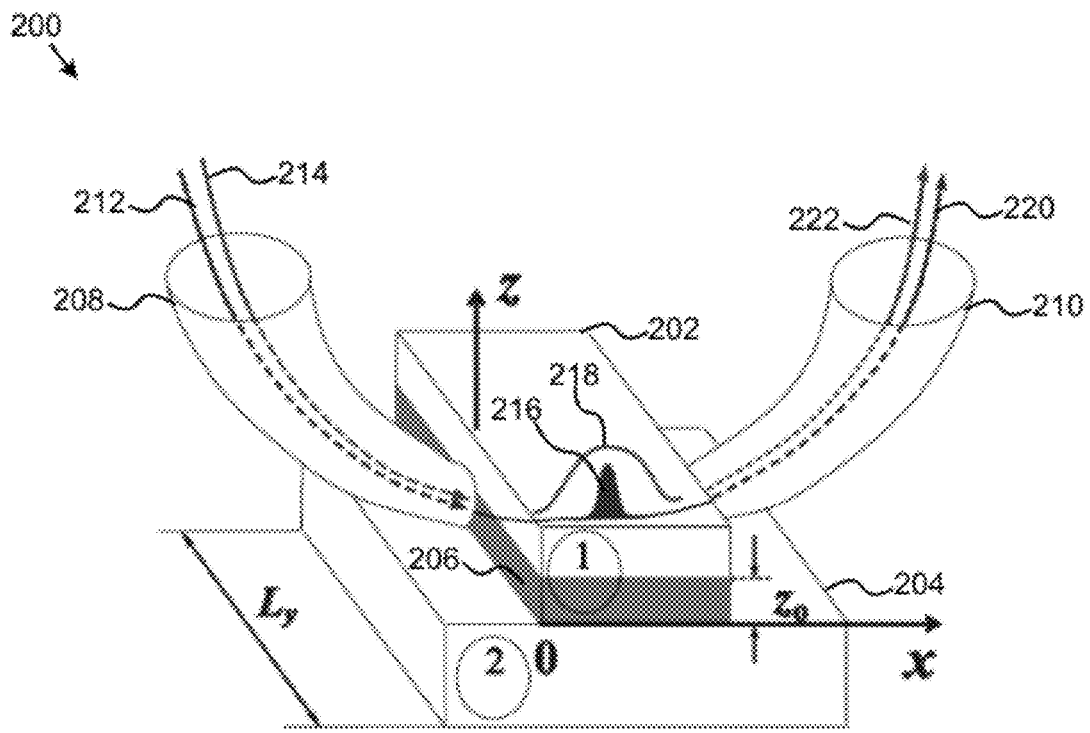
FIG. 2 is a schematic perspective view diagram illustrating one embodiment of an apparatus for fast all-optical switching.

FIG. 2 illustrates one embodiment of an apparatus 200 for fast all-optical switching. In a particular embodiment, the photon modulator 106 may comprise the apparatus 200. In one embodiment, the apparatus 200 includes a first light transmitting medium 202. The apparatus 200 may also include a second light transmitting medium 204 coupled to the first light transmitting medium 202 and disposed to form an interface region 206 between the first light transmitting medium 202 and the second light transmitting medium 204.

In a further embodiment, at least one of the first light transmitting medium 202 and the second light transmitting medium 204 comprises Negative Index Meta-Material (NIMM). In NIMM, the dielectric permittivity $\epsilon_0 \epsilon(\omega)$ and magnetic permeability $\mu_0 \mu(\omega)$ may both be negative with respect to $\omega$, the SP mode carrier frequency, and $\epsilon$ and $\mu$ may be dimensionless. Thus, NIMM can highly suppress SP propagation losses. Such a mode may be referred to as 'low-loss SP' (LLSP). In a particular embodiment, two different LLSPs can be simultaneously controlled and strongly interact via a cross-Kerr interaction, i.e. low-loss nonlinear quantum polaritonics. The other light transmitting medium 202, 204 may comprise a dielectric material.

Additionally, the apparatus may include a plurality of Lambda atoms (illustrated in FIG. 3) disposed in the interface region 206. The Lambda atoms may be adapted to cause EIT in the interface region 206 in response to an incident photon.

In a further embodiment, the apparatus 200 may include a first optical conductor 208. The first optical conductor 208 may be coupled to at least one of the first light transmitting medium 202 and the second light transmitting medium 204. The first optical conductor 208 may direct a photon to the interface region 206. The apparatus 200 may also include a second optical conductor 210 coupled to at least one of the first light transmitting medium and the second light transmitting medium, the second optical conductor configured to receive the photon from the interface region. In a particular embodiment, the first optical conductor 208 and the second optical conductor 210 may include an optical waveguide device, such as a fiber optic.

In still another embodiment, the first optical conductor 208 is configured to direct a plurality of laser beams 212, 214 to the interface region to create two surface polaritons in the interface region. In a particular embodiment, the two laser beams 212, 214 may comprise the signal laser beam 114 and the escort laser beam 116.

The apparatus 200 may be further adapted to perform quantum cryptography on the photon.

Figure 3:
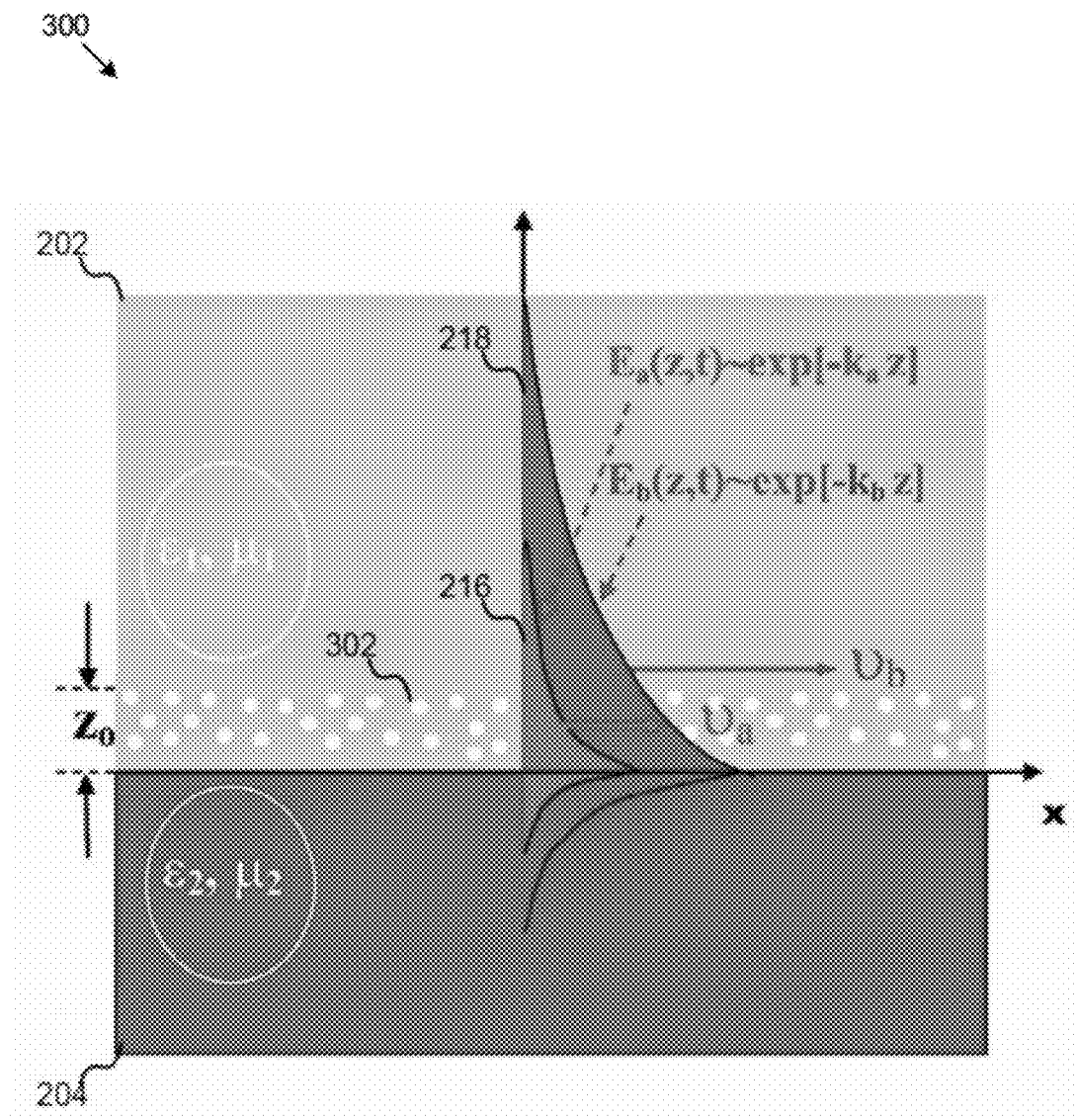
FIG. 3. is a graphical representation of two SPs that may occur in one embodiment of an apparatus for fast all-optical switching.

FIG. 3 depicts a first SP 216 and a second SP 218 created between the first light transmitting medium 202 and the second light transmitting medium 204, where i=1,2 with permittivities $\epsilon_i$ and permeabilities $\mu_i$ respectively. The first light transmitting medium 202 is in the region z>0 and the second light transmitting medium 204 in the region z<0. The pulses propagate forward in the +x direction and are exponentially confined to the interface z=0. The white spots represent 5-level atoms 302 in the double $\Lambda$ configuration (Lambda atoms) and are confined to a region between z=0 and z=$z_0$.

Each medium 202, 204 has permittivity $\epsilon_j$ and permeability $\mu_j$ with j=1 for the upper (z>0) dielectric medium and j=2 for the lower (z>0) NIMM medium. In the dielectric component, confined to within $z_0$ of the interface, there is a collection of five-level atoms that provide a DEIT medium. The LLSP mode is excited at a planar NIMM-dielectric interface by an incoming laser beam, which excites two forward propagating SP modes 216 and 218 (a and b in the equations below), depicted in FIG. 3. These two LLSP pulses 216 and 218 (a and b in the equations below), are the two pulses we will show interact with giant XPM and low loss. Their respective wavenumbers are $k_a$ and $k_b$, and velocities are $v_a$ and $v_b$. The normal component $k_j$ of the SP wavevector in each region satisfies $k_j^2 = K_\parallel^2 - \omega^2 \epsilon_{j\mu j}/c^2$, for $K_\parallel$ the component of the SP's wavevector in the forward (+x) direction.

For the dielectric, we assume $\epsilon_1$ and $\mu_1$ are constant but write $$\epsilon_2(\omega) \equiv \epsilon_r(\omega) + i\epsilon_i(\omega) = \epsilon_b - \frac{\omega_e^2}{\omega(\omega + i\gamma_e)}, \quad (1)$$

$$\mu_2(\omega) \equiv \mu_r(\omega) + i\mu_m(\omega) = \mu_b - \frac{\omega_m^2}{\omega(\omega + i\gamma_m)},$$

where $\omega_e(\gamma_e)$ corresponds to electric plasma frequency (decay rate) and $\omega_m(\gamma_m)$ to magnetic plasma frequency (decay rate). Typical values are $\omega_e = 1.37 \times 10^{16} s^{-1}$ and $\gamma_e = 2.73 \times 10^{13} s^{-1}$, and we assume for the magnetic components $\omega_e = \omega_e/5$ and $\gamma_m = \gamma_e/1000$. The background dielectric constant $\epsilon_b$ in real metals may be assumed to be between 1 and 10 and values of $\epsilon_b = 2.5$ and $\mu_b = 2.5$ may be fixed.

For a given SP, the wavenumbers on each side of the interface (z=0) are related by the boundary conditions so $-k_2/k_1 = \eta = \eta_\epsilon := \epsilon_2/\epsilon_1$ for a transverse magnetic (TM) SP. For the transverse electric (TE) SP, $\eta = \eta_\mu := \mu_2/\mu_1$. The TM mode dispersion relation is $$K_\parallel = k_\parallel(\omega) + i\kappa(\omega) = \frac{\omega}{c}\sqrt{\epsilon_2\mu_2 \frac{1 - \eta_\epsilon/\eta_\mu}{1 - \eta_\epsilon^2}} \quad (2)$$

and the TE mode dispersion relation is obtained by exchanging $\eta_\epsilon \leftrightarrow \eta_\mu$; here the absorption coefficient $\upsilon(\omega) \to 0$ if $\gamma_e \to 0$ and $\gamma_m \to 0$.

The dispersion relation and boundary condition then characterize SP amplitude vs distance z from the interface. For the TM polarized case the electric field is $\vec{E}_{1,2}(r,t,k_\parallel) = \vec{E}_{1,2}(k_\parallel)\exp\{-k_{1,2}z - \kappa x + i(k_\parallel x - \omega t)\}$ and $\vec{E}_{1,2}(k_\parallel) = (\hat{x} \pm i\hat{z}k_{1,2}/k_\parallel)N(k_\parallel)$ with a normalization factor $N(k_\parallel) = \sqrt{\hbar\omega(k_\parallel)/(2\pi\epsilon_0 L_y L_z(\omega,\epsilon,\mu))}$. For $L_y$ is medium extent y-direction and $L_z$ a quantization length along z-direction given as $$L_z = \left[\epsilon_1\left(\frac{|k_\parallel|^2}{|k_1|^2}\right) + \frac{\omega^2}{c^2}\tilde{\mu}_1\frac{|\epsilon_1|^2}{|k_1|^2}\right]\zeta_1 + \left[\epsilon_2\left(1 + \frac{|k_\parallel|^2}{|k_2|^2}\right) + \frac{\omega^2}{c^2}\tilde{\mu}_2\frac{|\epsilon_2|^2}{|k_2|^2}\right]\zeta_2, \quad (3)$$

where $\tilde{f}_j = \text{Re}[\partial(\omega f_j)/\partial\omega]$ and field confinement is $\zeta_j \approx 1/\tilde{k}_j(\omega)$, with $\tilde{k}_{1,2} = \text{Re}[k_{1,2}]$.

From Eq. (3), it may be shown that large field confinement (i.e. small $\zeta_j$) leads to a small quantization volume. Thus, large atom-field coupling may result. The electric field amplitude may decay exponentially away from the interface, hence confinement to a scale $\zeta_1$, in the dielectric medium. Whereas SP losses are enhanced with increasing transverse spatial confinement, with this attrition especially pronounced in the optical region, thereby leading to one of the main drawbacks of SPs, but a NIMM-dielectric interface may highly suppress losses for some frequency range. From Eq. (2), it can be shown that $\kappa(\omega \approx \omega_0) \approx 0$ (losses are eliminated) for $\omega_0$ determined by $$\frac{\mu_j}{\epsilon_j} = \frac{(\epsilon_r^2 + \epsilon_1^2)\mu_r - 2\epsilon_r\epsilon_1\mu_1}{\epsilon_r(\epsilon_r^2 - \epsilon_1^2)}, \quad (4)$$

which cannot be satisfied for an interface between a dielectric and metal where $\mu_1$ and $\mu_r$ may both be positive, whereas one may be positive and the other may be negative for the dielectric-NIMM interface. The existence of an extremely low-loss carrier frequency $\omega_0$ seems counterintuitive if one's experience is with real metal/dielectric interfaces, but is nonetheless predicted by Eq. (3) where a destructive interference may occur between electric and magnetic absorption processes provided that $\mu_r(\epsilon_r^2+\epsilon_1^2)=2\epsilon_r\epsilon_1\mu_1$ at $\omega_0$ for usual ratio between magnetic and electric decay rates $\mu_1/\epsilon_1 \ll 1$.

Equation (4) describes the trade-off between absorption $\kappa(\omega)$ and confinement in the dielectric medium $\zeta_1(\omega)$. Accordingly, the trade-off using a NIMM-dielectric interface may be overcome. From the expression for $k_j^2$ the transverse confinement of the SP TM modes in the dielectric may be characterized as $$\zeta_1 \approx \frac{c}{\omega}\left[\text{Re}\sqrt{\frac{\varepsilon_1\mu_1(1-\eta_\varepsilon\eta_\mu)}{\eta_\varepsilon^2-1}}\right]^{-1}. \quad (5)$$

where it can be assumed that both $\eta_\epsilon^2-1$ and $(1-\eta_\epsilon\eta_\mu)$ are either positive or negative. This simple relation may imply complete transverse confinement of SP fields in the limit $\eta_\epsilon^2 \to 1$ (from above); i.e., $\epsilon_r \sim \epsilon_1$. As seen from the same equation, SP modes can transform into freely propagating (completely deconfined) light fields for $\eta_{\epsilon\eta\mu} \to 1$, i.e., when $\epsilon_1\mu_1=\epsilon_2\mu_2$. Evidently low loss SP modes may not be excited in a medium with complete transverse confinement (in the usual macroscopic sense) because Eq. (4) (where $\mu_i/\epsilon_i \to 0$) and Eq. (5) may be satisfied simultaneously in order to achieve low losses and spatial confinement. Thus, according to Eq. (4) losses may be suppressed when $\mu_r=\mu_1$ (in particular we use $\mu_1=1$) and $\epsilon_r=-\epsilon_1$; however, here SP modes again may transform into free propagating light. This mathematical analysis agrees with the intuitive picture of the trade-off between low losses and spatial confinement that we described earlier.

Figure 4:
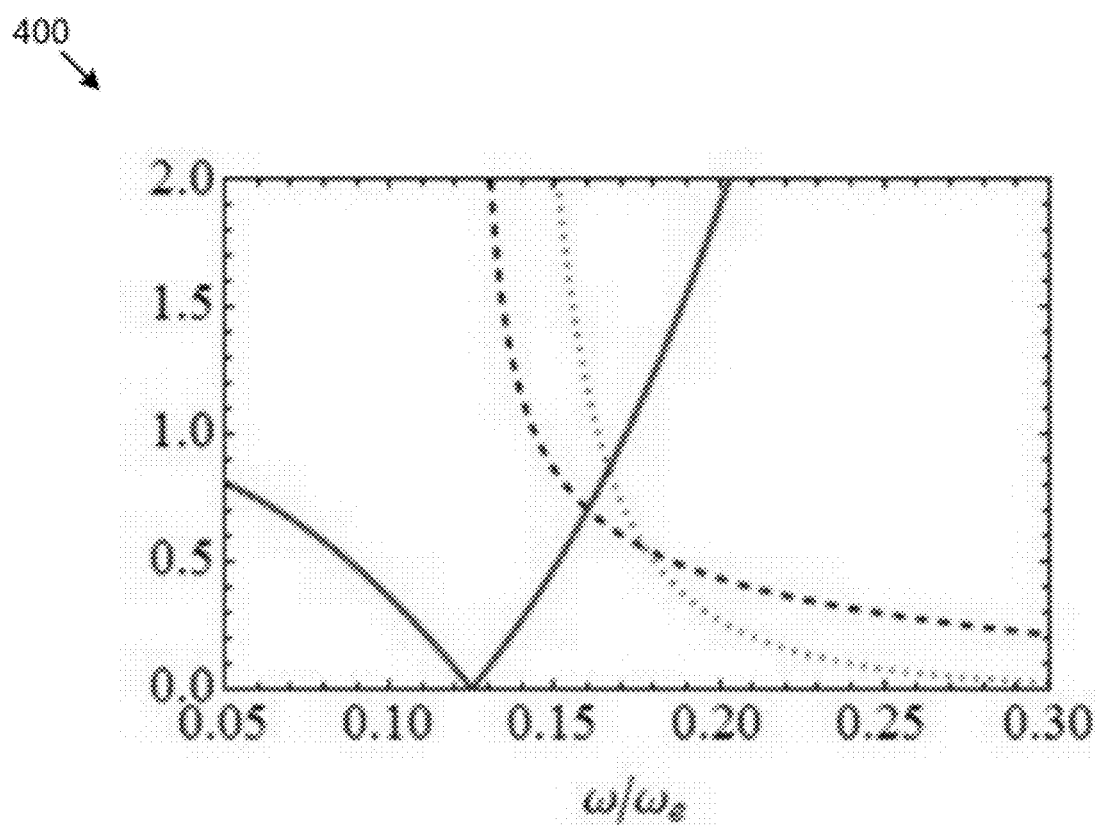
FIG. 4. is a line graph illustrating three characterizations of LLSPs as a function of $\omega/\omega_e$ for $\omega_e=1.37\times10^{16}$ 1/s: absorption loss (Eq. 2) (solid line, in units of $10^4$ m$^{-1}$); confinement factor $\zeta_1$ as given in Eq. (5) (dashed line); and quantization length ( dotted line) in units of $\lambda=606$ nm, the transition wavelength in Pr:YSiO.

FIG. 4 illustrates spectral dependence of the absorption coefficients $\kappa$ and spatial confinement $\zeta_1$ of SP modes 216, 218 for NIMM-dielectric interface in the spectral range close to $\omega_0$ of complete suppression of the losses. As seen from FIG. 4, a complete suppression of losses is accompanied by a deconfinement of LLSP modes (i.e. is $\kappa \to 0$ with $\zeta=\infty$). From numerical analysis, it may be shown that the frequency $\omega_0$ of complete SP loss suppression is most sensitive to the magnetic plasmon frequency $\omega_m$, to the ratio of magnetic to the electric loss rate and to the electric and magnetic permeabilities as well. Thus the frequency $\omega_0$ can be effectively changed by using different metamaterials and by changing the external physical control parameters such as temperature. Using compounds with pure metallic characteristics in NIMM and decreasing temperature can lead to lowering of the decay constants $\gamma_e$ and $\gamma_m$ in electric and magnetic permeabilities by more than a few orders of magnitude. Thus the meta-material characteristics should be selected according to the frequency range of the light sources 102, 104.

As shown in FIG. 4, the carrier frequency of LLSP may span a frequency range where transverse spatial confinement $\zeta_1 < \lambda$ with large enhancement of electric field close to the NIMM-dielectric interface. The low loss SPs enable the field quantization to be carried out in a dispersive but in otherwise nearly lossless medium and we can thus explore the quantum dynamics of LLSP coupled to atomic system for $\kappa L_x \ll 1$ (for $L_x$ the propagation length along the x-direction) with such spatial confinement in the framework of full quantum theory of LLSP fields with carrier frequencies close to $\omega_0$ where we find that spectral behavior of the quantization length $L_z$ Eq. (3) of LLSP fields perpendicular to the interface correlates with the transverse confinement $\zeta_1$ may exist.

As shown in FIG. 4, the ratio $L_z/\lambda \sim 60$ gives a minimum for spatial size of the dielectric medium along z-direction. Examinations of the performed analysis show that using a dielectric medium with smaller transverse spatial size $L_z/\lambda < 10$ may lead to the same properties of SP fields with accuracy $\sim 10^{-3}$ since the SP field decreases by $10^3 \times$ with distance $z \sim 7\lambda$ from the interface. Thus the LLSP fields realize a large transverse confinement of the electromagnetic fields with an increase in their propagation length in the medium.

In a further embodiment, it may be shown that these properties of LLSP fields may be used to realize giant enhancement of nonlinear interaction between two weak LLSP pulses. The present embodiments may achieve a large Kerr nonlinear coefficient in solid state systems by exploiting the highly confined LLSP fields, and hence, to get the large phase shift of up to $\pi$ radians required for the implementation of many quantum optical processes (e.g. all-optical switching, quantum phase gates, etc). For example, a solid state system comprising Pr:YSiO EIT and DEIT effects that are the mechanism to achieve large phase shifts may be realized. In such an embodiment, information storage and retrieval and storage time of a few seconds has been observed. Additionally, as a solid state system, problems inherent in gaseous systems such as Doppler broadening and motion of atoms into and out of laser beams may be avoided.

In a particular embodiment, the system may produce one particular nonlinear interaction of interest, which uses a five-level atom (SLA) from the $Rb^{87}$ $D_2$ line, leading to a uniform nonlinear phase shift for two slowly propagating interacting light pulses under DEIT conditions. This 5LA scheme may be adapted for our SP fields interacting in Pr:YSiO. In a further embodiment, the nonlinear interaction between weak light fields may be enhanced by creating slowly co-propagating LLSP fields characterized by large transverse (along z-direction) and longitudinal (along x-direction) confinement and by increasing the interaction time due to the EIT condition. It may be assumed that lateral confinement along y-direction of LLSP field $L \cong L_y$ is due to initial focusing of the light pulse on the medium interface, by assuming a small enough spatial length of the medium along x-direction $L_x \leq k_\parallel L_y^2$. This leads to $L_y \cong 10\lambda$. The lateral confinement may be strengthened by scattering the SPs modes at locally created defects at well controlled positions that can be introduced in the form of nanoscale particle-like or nanowire structures in the NIMM part. These nanoscale defects play the role of Bragg reflectors to increase the lateral confinement. Alternatively lateral confinement may be realized by creating a groove along the x-axis. In our numerical calculation, we used only a maximum length $L_x=k_\parallel L_y^2$. Such techniques have been used for SPs routing.

Figure 5:
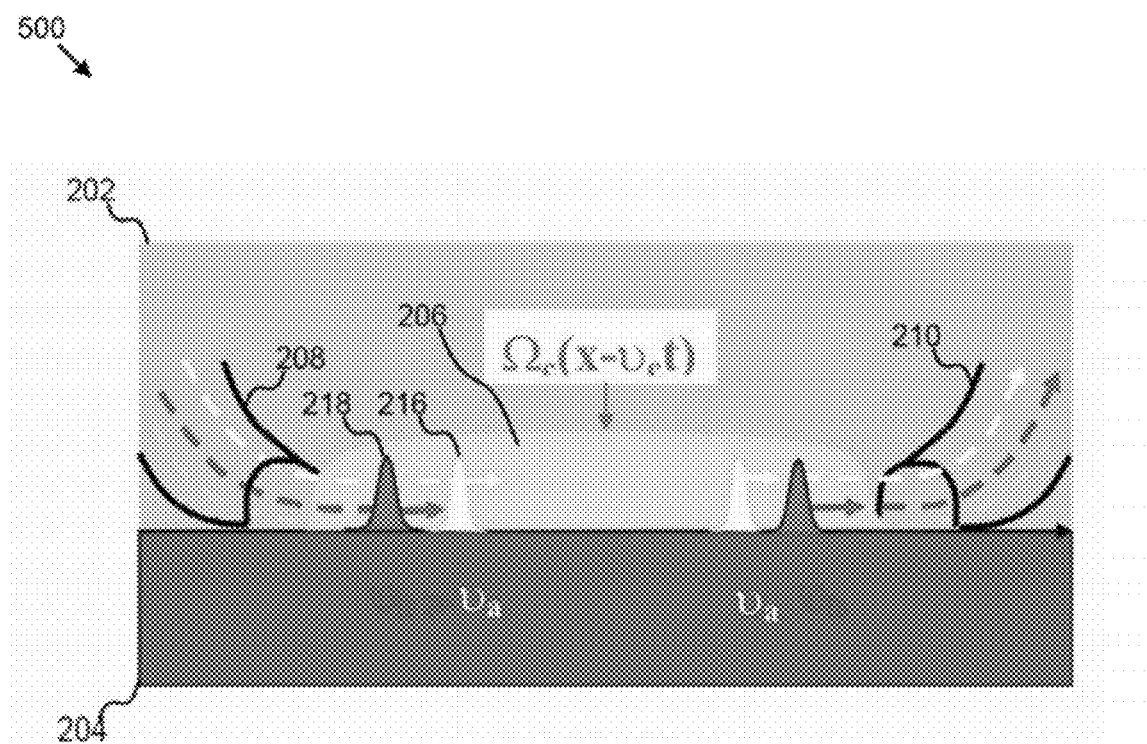
FIG. 5. is a spatial and temporal diagram illustrating one embodiment of excitation and interaction of two slow LLSP pulses propagating with group velocities $\upsilon_h>\upsilon_a$ in the presence of control field fi$_c$.
Figure 6:
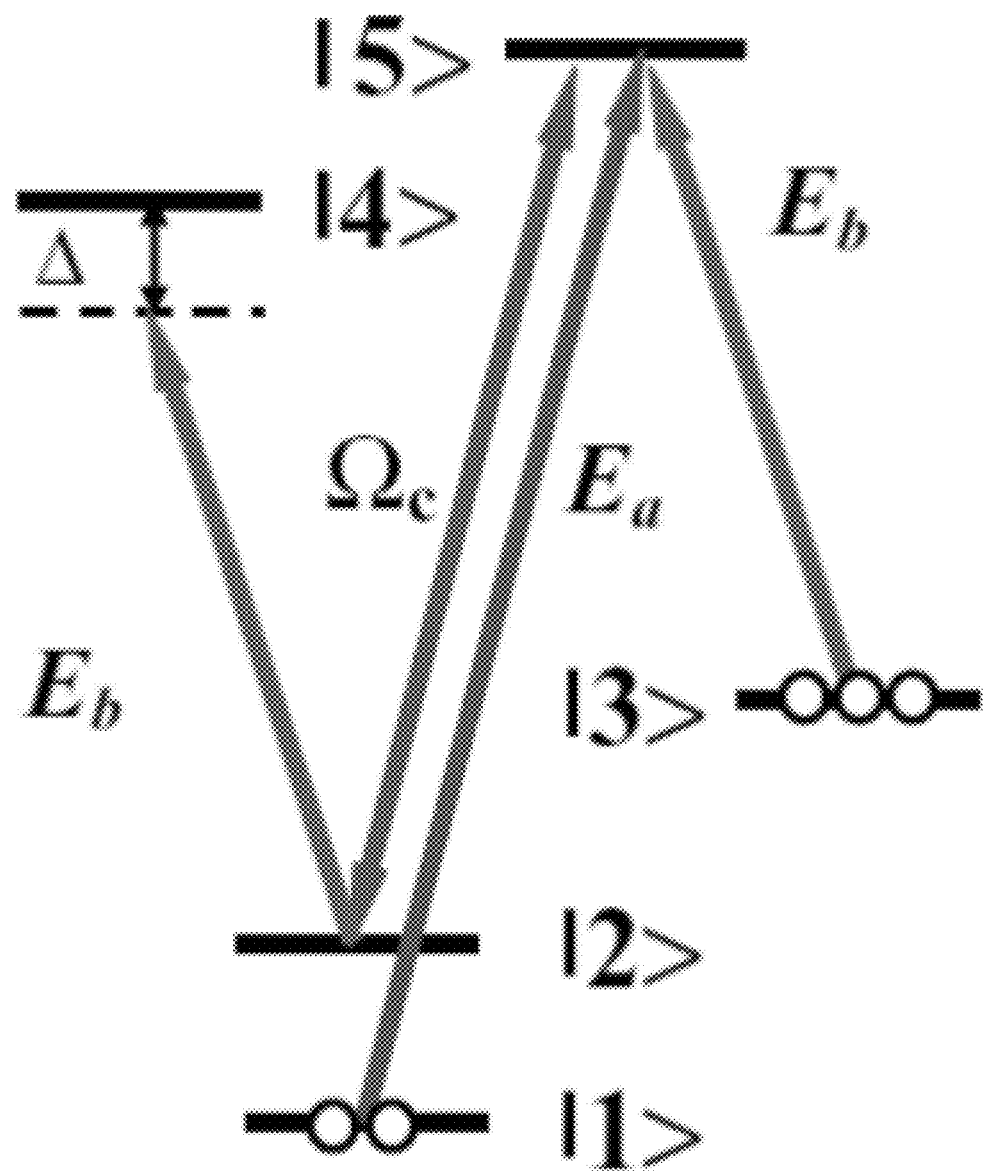
FIG. 6. is an energy diagram and level scheme illustrating one embodiment of energy levels of two pulses passing through a 5LA system of Pr:YSiO.

In one embodiment, it may be assumed that the two interacting LLSP pulses are excited one by one at the interface input with slightly different adjusted group velocities $\upsilon_{a,b}$. In such an embodiment, the second LLSP pulse may have larger group velocity $\upsilon_b > \upsilon_a$ and outrace the first LLSP at the medium output as it is depicted in FIG. 5. The two pulses may pass through a 5LA system of Pr:YSiO, whose energy diagram and level scheme are shown in FIG. 6. In one embodiment, the second LLSP pulse outraces the first LLSP pulse in the medium output. Both pulses get uniform nonlinear phase shift after interaction. Nonlinear coupled equations for two slowly propagating LLSP fields may be derived by taking into account spatial confinement of interaction with resonant atomic systems, and we get the Kerr nonlinear coefficient field a due to cross phase modulation of field b as:

$$\left(\frac{1}{v_b}\frac{\partial}{\partial t} + \frac{\partial}{\partial x}\right)\hat{a}_b(t,x) = i\chi_a \hat{I}_a(t,x)\hat{a}_b(t,x), \quad (6)$$

$$\chi_a = \frac{2\pi n_a z_0 \Phi\left[(\tilde{k}_a^p + \tilde{k}_b^p - \tilde{k}^c)z_0\right]}{\hbar^4 v_{b,o}|\Omega_c|^2 \Delta}\langle|\vec{d}_{24}\vec{E}_b|^2|\vec{d}_{15}\vec{E}_a|^2\rangle, \quad (7)$$

where $\hat{I}_a(t,x) = \hat{a}_a^+(t,x)$, and LLSP fields (l=a,b) satisfy bosonic commutation relations $[\hat{a}_l(t,x),\hat{a}_{l'}^+(t,x')] = \delta_{l,l'}\delta(x-x')$. $\tilde{k}_{a,b}^p$ is the real part of the wave vector of SP field (a, or b) along z and $\tilde{k}^c$ is the control field wave vector along z. $v_l = v_{l,o}/(1+\beta_l)$ is the group velocity of l-th slowly propagating LLSP pulse, $v_{l,o}$ is the group velocity of l-th LLSP pulse in the absence of the resonant atoms, $\beta_b = 2\pi n_b z_0 \Phi[(\tilde{k}_b^p - \tilde{k}^c)z_0]\langle|\vec{d}_{35}\vec{E}_b|^2\rangle/(\hbar^2|\Omega|^2), \Phi(y) = e^{-y}\text{Sh}(y)/y, z_0$ is spatial thickness of the atomic medium along z-direction, $\Omega_c$ is the Rabi frequency of the controlled field, $n_b$ is atomic density on the 3-rd level, $\Delta$ is the spectral detuning, $\vec{d}_{24}, \vec{d}_{15}$ are atomic dipole moments of atomic transitions presented in FIG. 6. $\vec{E}_l$ is the quantized electric field of l-th LLSP pulse which is given as in Eq. (3) with local effects included, and $\langle \ldots \rangle$ denotes averaging over the orientation of the atomic dipole moments. We note that $\chi_b \approx 0$ due to larger spectral detuning of the first LLSP field from the atomic resonance transition $|2\rangle \leftrightarrow |6\rangle$. Eq. (6) is correct for spatial length $L_x \leq k_\parallel L_y^2$ where the diffraction effects in LLSP fields propagation can be ignored. Using of dielectric/NIMM interface grooved along x-axis excludes the negative influence of the diffraction effects on spatial confinement of the LLSP pulses along y-direction that promises a higher and more robust spatial confinement.

Additionally, the LLSP $\hat{a}_b(t,x)$-mode may suffer different strengths of the nonlinear interaction with other b mode in a transverse y×z cross-section due to highly inhomogeneous intensities of the electromagnetic fields. However Eq. (6) illustrates that the nonlinear interactions existing in the cross-section lead to the averaged integral nonlinear Kerr coefficient $\chi_a$ for traveling $\hat{a}_b(t,x)$-mode. A similar integral effect takes place for self-cross modulation of LLSP pulse and it can be ignored for the single photon LLSP fields. The described integral effect in the cross-phase modulation is impossible, however, for usual free space schemes used in where the transversally inhomogeneous nonlinear interaction can lead to the transverse light field modulation and appropriate diffraction at the their propagation along x-direction which limits a spatial focusing of the interacting fields. The nonlinear LLSP interactions demonstrate robustness of the homogeneous phase shift in the cross-section for highly confined spatially inhomogeneous traveling electromagnetic field modes. Eq. (6) describes the corresponding nonlinear phase shift experienced by single quantum LLSP field a after passing through the other single quantum LLSP pulse b in the medium of length $L_x$ is given as $\Phi_{XPM} \sim \chi_a^{(3)}(\omega_0) \times L_x/(\delta t v_{a,0})$ where $\delta t$ is the SP pulse temporal duration.

Figure 7:
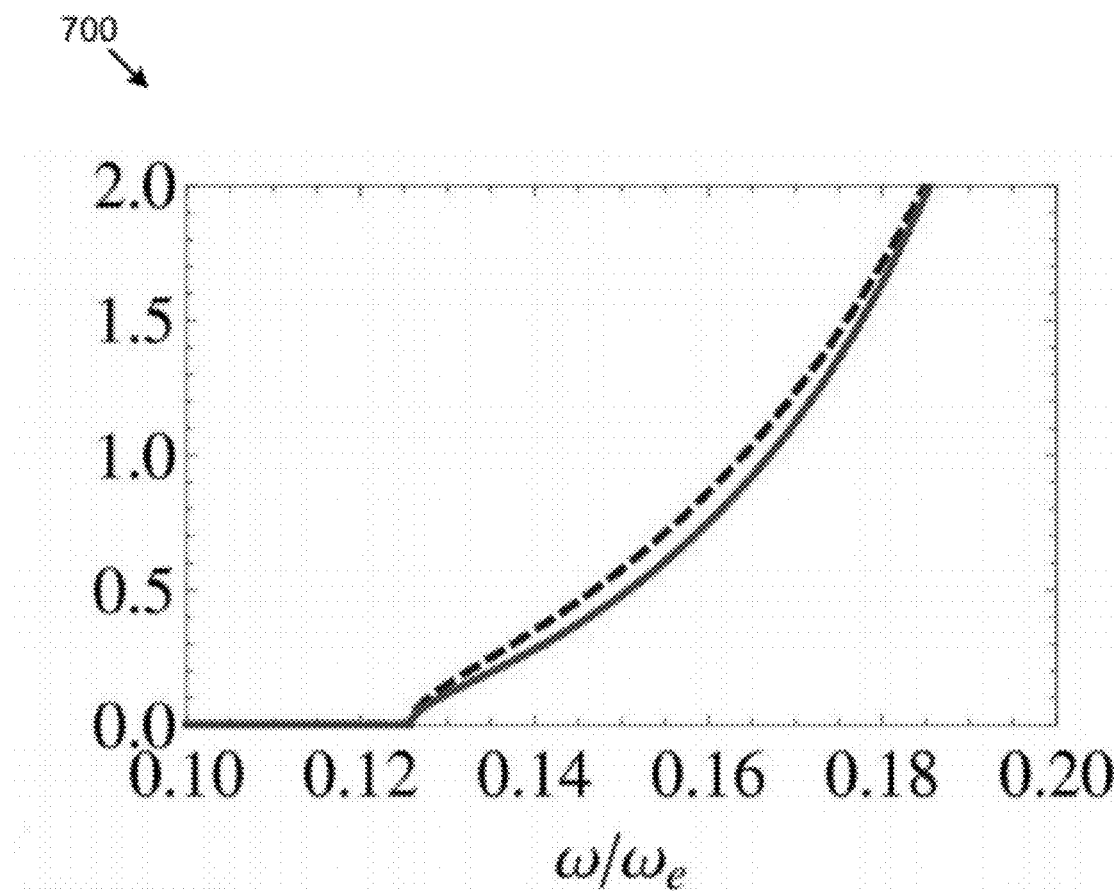
FIG. 7. is a line graph illustrating third order susceptibility that result from one embodiment of a double EIT scheme ($\times 10^5$) as a function of probe field frequency $\omega/\omega_e$ for $\omega_e=1.37\times10^{16}$1/s and the corresponding phase shift (dashed line) due to SP cross phase modulation in the embodiment of a double EIT scheme (in units of $\pi$) as a function of probe field frequency $\omega/\omega_e$.

For the 5LA in Pr:YSiO it may be assumed that ideal EIT conditions which take place for small enough thickness of the atomic layer $k_l^p z_0 \approx k^c z_0 \approx 1$, the transition wavelength is 606 nm, the linewidth is about MHz and the detuning $\Delta=1.38$ MHz, Rabi frequency of control field $\Omega_c=1$ MHz. We estimate the dipole moments for such transition to be of the order $10^{-3}$ $ea_0$ where e is the electronic charge and $a_0$ is the Bohr radius. We have chosen the media parameters such that the transition wavelength 606 nm corresponds to SP frequency $\omega=0.167\omega_e$ which is very close to $\omega_0$ where SP fields exhibit low losses and large confinement. The atomic density of level 1 may be about $10^{20}$ cm$^{-3}$, which is close to typical solid medium. The medium size along x-direction is assumed $L_x \approx 1$ mm and the SP pulse temporal duration is assumed of the order as 0.1 μs. FIG. 7 illustrates results from a system using this set of parameters. The Kerr nonlinear coefficient for field a, and the corresponding phase shift due to cross phase modulation between the weak SP pulses.

Near and below the frequency $\omega_0$ where SP fields exhibit low losses, the real part of $k_1$ is nearly zero. This leads to field deconfinement, i.e. very poor confinement (large $\zeta_j$), and large quantization length. This effect may lead to weak coupling of SP fields to atoms near interface, hence both Kerr coefficient and phase shift are very small. As this frequency region is passed by to higher frequencies where real part $k_1$ gets larger, field confinement enhances further and further (i.e. small $\zeta_j$) thus decreasing the quantization volume and the SP coupling to atoms increases with increasing SP frequency. Thus, Kerr coefficient and phase shift increase. By adjusting the media parameters, giant Kerr nonlinear coefficient and phase shift of the order π at the required frequency may be achieved. In such an embodiment, the Pr:YSiO transition frequency corresponds to $\omega=0.167\omega_e$. The present embodiments may operate at wavelengths in the range 700-800 nm while our working wavelength for Pr:YSiO is about 606 nm. Using some the current fabrication techniques it seems possible to fabricate the required NIMM structure at the desired Pr:YSiO by combining magnetic structure resonant at 606 nm with semicontinuous (mixture of dielectric and metal with appropriate ratio) metal structure with broader frequency range including the desired frequency.

These figures demonstrate that the present embodiments may be adapted to meet the requirements of low losses, large confinement, large Kerr nonlinear coefficient and cross phase shift of order π. Whereas the analysis presented here pertains to a solid state system namely Pr:YSiO, the low loss SP and their high confinement together with DEIT scheme should also be applicable to gaseous system like Rb[87] with appropriate choices of parameters.

In a typical EIT experiment the solid state system may be cooled down to very low temperatures in order to achieve EIT conditions and similar techniques may be required for the analyzed DEIT experiments. When the solid state system is cooled down to low temperatures, the electron scattering rates may be reduced, and thus, the electric $\gamma_e$ and magnetic decay rates $\gamma_m$ may be reduced further. Thus, requirements of DEIT should lead to low decay rates, which may lead to even SP lower losses. The higher spatial confinement and an existence of LLSP modes in a broad spectral range demonstrate effective nonlinear LLSP interactions for shorter light pulses.

Super Giant Cross-Phase Modulation

Cross-Phase Modulation (XPM) between single photon fields is a topical problem of optical quantum processing. XPM may be achieved through enhanced DEIT-based XPM using spatially confined surface polariton (SP) fields. For example, XPM can use SP-fields formed on the surface interface between two media where one or two of them can be a meta-material. A considerable enhancement of nonlinear interaction between the weak SP fields is estimated due to SP spatial confinement, which increases their electrical fields. The increased electrical fields may provide an enhancement of the polariton-atom coupling constant.

Meta-materials support both electric and magnetic SP modes. In one embodiment, SP quantum evolution arises at the interface (located at z=0) of two media. As shown in FIG. 3, the first medium 202 with constant electric permittivity $\in_1$ and magnetic permeability $\mu_1$ may occupy the half space z>0, and the second medium 204 may occupy the half space z<0, with "running" electric permittivity $\in_0 \in_2(\omega)$ and magnetic permeability $\mu_0\mu_2(\omega),\omega$ is the SP fields frequency. The SP fields propagate along the x-direction parallel to the interface region 206 of resonant atomic ensemble where interaction with Lambda atoms 302 takes place. It may be assumed that the atoms are prepared in the interface region 206 comprising a layer of thickness $z_o$ with constant atomic density n. From a symmetrical point of view, only XPM of SPs using interaction scheme with 5-level atomic scheme is described (see FIG. 6).

It may be assumed that the two control SP fields (with Rabi frequencies $\Omega_{a,b}$) have carrier frequencies $\omega_a^c=\omega_{41}$ and $\omega_b^c=\omega_{63}$. The two quantum probe, a- and b-, SP fields ($\hat{a}(t,z)$ and $\hat{b}(t,z)$) have the carrier frequencies $\omega_a^p=\omega_{42}$ and $\omega_b^p=\omega_{62}$. EIT may take place for the both quantum fields in a presence of to additional control classical $\Omega_{a,b}$ SP fields. At the same time, the quantum fields may induce a symmetrical XPM to each other due to their nonresonant interaction on the atomic transitions 1-5 and 3-5 (see FIG. 6). By developing the approach to quantum evolution of SP field in the XPM scheme, an equation system for SP fields has been developed.

$$\left\{\frac{1}{v_a}\frac{\partial}{\partial t}+\frac{\partial}{\partial x}\right\}\hat{a}(t,x)=i\chi_B\hat{b}^+(t,x)\hat{b}(t,x)\hat{a}(t,x), \quad (8)$$

$$\left\{\frac{1}{v_b}\frac{\partial}{\partial t}+\frac{\partial}{\partial x}\right\}\hat{b}(t,x)=i\chi_A\hat{a}^+(t,x)\hat{a}(t,x)\hat{b}(t,x), \quad (9)$$

where $$\frac{1}{v_a}=\frac{1}{v_{pa}(\omega_{42})}\left\{1+\frac{\pi n\left\{1-e^{-2(k_{|a}^p-k_{|a}^c)z_p}\right\}}{(k_{|a}^p-k_{|a}^c)}\frac{|(\vec{d}_{24}\vec{E}_{0a}^p)|^2}{\hbar^2|\Omega_a|^2}\right\}, \quad (10)$$

Where $v_{a,b}$ are SP pulse group velocities slow down due to the EIT effect and increasing of a- and b- SP intensities $|\vec{E}_{0a;b}^p|^2$, $v_{pa}(\omega_{42})=\partial\omega(k)/\partial k_x$, is group velocity of the a-SP field at frequency $\omega_{42}$ in absence of the atomic system; $\omega(k)$ is a dispersion relation of the SP modes; $\vec{d}_{nm}$ is an dipole moment of atomic transition $|n>\hbar|m>$; $k_{|a;|b}^p$ and $k_{|a}^c$ are the wave numbers of SP fields along z-directions; $\chi_{A,B}$ are coefficients of nonlinear Kerr-effect, in particular $$\chi_B=\pi n\frac{\left\{1-e^{-2(k_{1a}^p+k_{1b}^p-k_{1b}^2)L}\right\}}{(k_{1a}^p+k_{1b}^p-k_{1b}^2)}\frac{|(\vec{d}_{26}\vec{E}_{0b}^p)(\vec{d}_{35}\vec{E}_{0a}^p)|^2/\hbar^4}{v_{pa}(\omega_{42})(\omega_{53}-\omega_{42})|\Omega_b|^2}. \quad (11)$$

Group velocities $v_b$ and $v_{pb}(\omega_{62})$ of the b-SP pulse and nonlinear Kerr coefficient $\chi_A$ may be determined by the formulas similar to Eqs. (10) and (11).

General analysis of Eqs. (8)-(11) shows a drastic enhancement of nonlinear Kerr coefficients $\chi_{A,B}$ B due to considerable increasing of SP field amplitudes $E_{0a;b}^p$. The enhancement may increase with decreasing of SP quantization length $L_z$ which is perpendicular to the surface interface as $\chi_B \sim |(\vec{d}_{26}\vec{E}_{0b}^p)(\vec{d}_{35}\vec{E}_{0a}^p)|^2 \sim 1/L_z^2$ that at least can lead to additional factor of XPM enhancement $\sim 10^2-10^4$ depending on SP fields carrier frequencies and basic SP group velocities $v_{pa}(\omega_{42})$ and $v_{pb}(\omega_{62})$.

Using Eqs. (8)-(11), analytical and numerical analysis of enhanced XPM and yield the a scheme for application in nonlinear optics and quantum manipulations of single photon fields.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Methods for All-Optical Switching

Figure 8:
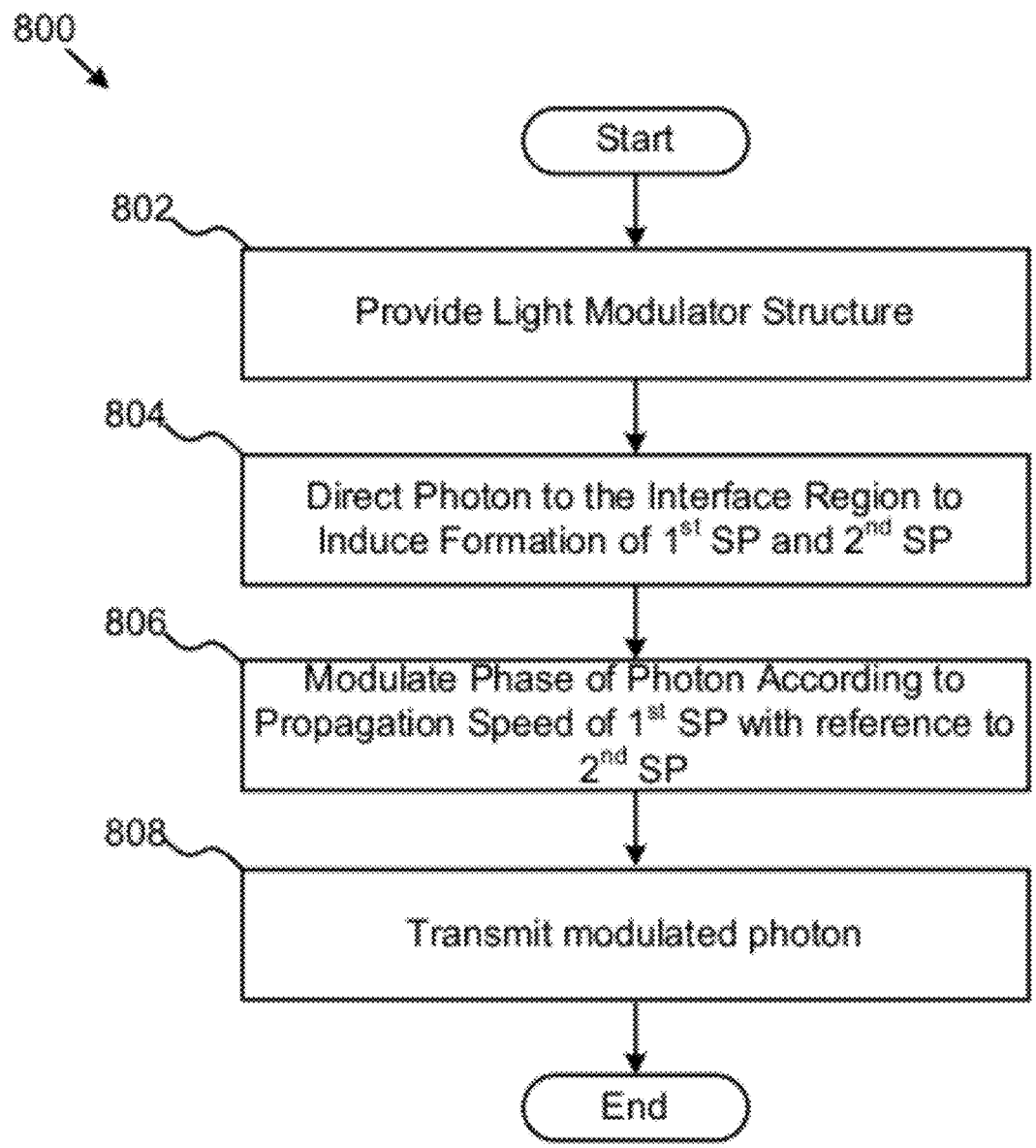
FIG. 8 is a schematic flowchart diagram illustrating one embodiment of a method for fast all-optical switching.

FIG. 8 illustrates a method 800 for fast all-optical switching. In one embodiment, the method 800 starts by providing 802 a structure comprising a first light transmitting medium 202, a second light transmitting medium 204 coupled to the first light transmitting medium 202 and disposed to form an interface region 206 between the first light transmitting medium 202 and the second light transmitting medium 204, and a plurality of Lambda atoms 302 disposed in the interface region 206, the Lambda atoms 302 adapted to cause Electromagnetically-Induced Transparency (EIT) in the interface region 206 in response to an incident photon.

The method 800 may also include directing 804 a photon to the interface region 206 to induce formation a first surface polariton 216 and a second polariton 218 that propagate through the interface region 206. In a further embodiment, the method 800 includes modulating 806 a phase of the photon according to a propagation speed of the first surface polariton 216 with reference to the propagation speed of the second surface polariton 218.

In one embodiment, the method 800 may also include receiving the photon from a first optical conductor 208 coupled to at least one of the first light transmitting medium 202 and the second light transmitting medium 204, the first optical conductor 208 configured to direct 804 a photon to the interface region 206. Likewise, the method 800 may further include transmitting 808 the photon to a second optical conductor 210 coupled to at least one of the first light transmitting medium 202 and the second light transmitting medium 204, the second optical conductor 210 configured to receive the photon from the interface region 206. In a further embodiment, the method may include receiving a plurality of laser beams 212, 214 from the first optical conductor 210, wherein the first optical conductor 210 is further configured to direct the plurality of laser beams 212, 214 to the interface region 206 to create the first surface polariton 216 and the second polariton 218 in the interface region 206.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

What is claimed is:

1. A fast all-optical switch system comprising:
    a first laser source configured to transmit a signal laser beam;
    a second laser source configured to transmit an escort laser beam;
    a photon modulator coupled to the first laser source and the second laser source and adapted to modulate the signal laser beam, the photon modulator comprising:
    a first light transmitting medium;
    a second light transmitting medium coupled to the first light transmitting medium and disposed to form an interface region between the first light transmitting medium and the second light transmitting medium; and
    a plurality of Lambda atoms disposed in the interface region, the Lambda atoms adapted to cause Electromagnetically-Induced Transparency (EIT) in the interface region in response to an incident photon; and
    one or more photon directors configured to direct a path of the signal laser beam responsive to the modulation of the signal laser beam.

2. The system of claim 1, further comprising a first optical conductor coupled to at least one of the first light transmitting medium and the second light transmitting medium, the first optical conductor configured to direct a photon to the interface region.

3. The system of claim 2, further comprising a second optical conductor coupled to at least one of the first light transmitting medium and the second light transmitting medium, the second optical conductor configured to receive the photon from the interface region.

4. The system of claim 2, wherein the first optical conductor is further configured to direct a plurality of laser beams to the interface region to create two surface polaritons in the interface region.

5. The system of claim 2, further adapted to perform quantum cryptography on the photon.

6. The system of claim 1, wherein at least one of the first light transmitting medium and the second light transmitting medium comprises negative index meta-material.

7. A method of operating a fast all-optical switch comprising:
    providing a structure comprising:
        a first light transmitting medium;
        a second light transmitting medium coupled to the first light transmitting medium and disposed to form an interface region between the first light transmitting medium and the second light transmitting medium; and
        a plurality of Lambda atoms disposed in the interface region, the Lambda atoms adapted to cause Electromagnetically-Induced Transparency (EIT) in the interface region in response to an incident photon;
    directing a photon to the interface region to induce formation of a first surface polariton and a second polariton that propagate through the interface region; and
    modulating a phase of the photon according to a propagation speed of the first surface polariton with reference to the propagation speed of the second surface polariton.

8. The method of claim 7, further comprising receiving the photon from a first optical conductor coupled to at least one of the first light transmitting medium and the second light transmitting medium, the first optical conductor configured to direct a photon to the interface region.

9. The method of claim 8, further comprising transmitting the photon to a second optical conductor coupled to at least one of the first light transmitting medium and the second light transmitting medium, the second optical conductor configured to receive the photon from the interface region.

10. The method of claim 8, further comprising receiving a plurality of laser beams from the first optical conductor, wherein the first optical conductor is further configured to direct the plurality of laser beams to the interface region to create the first surface polariton and the second polariton in the interface region.

11. The method of claim 8, further comprising encrypting the photon according to a quantum cryptography scheme.

12. The method of claim 7, wherein at least one of the first light transmitting medium and the second light transmitting medium comprises negative index meta-material.

* * * * *